(No Model.) 2 Sheets—Sheet 1.
F. E. HERDMAN.
CONTROLLING DEVICE FOR ELECTRIC MOTORS.
No. 519,122. Patented May 1, 1894.
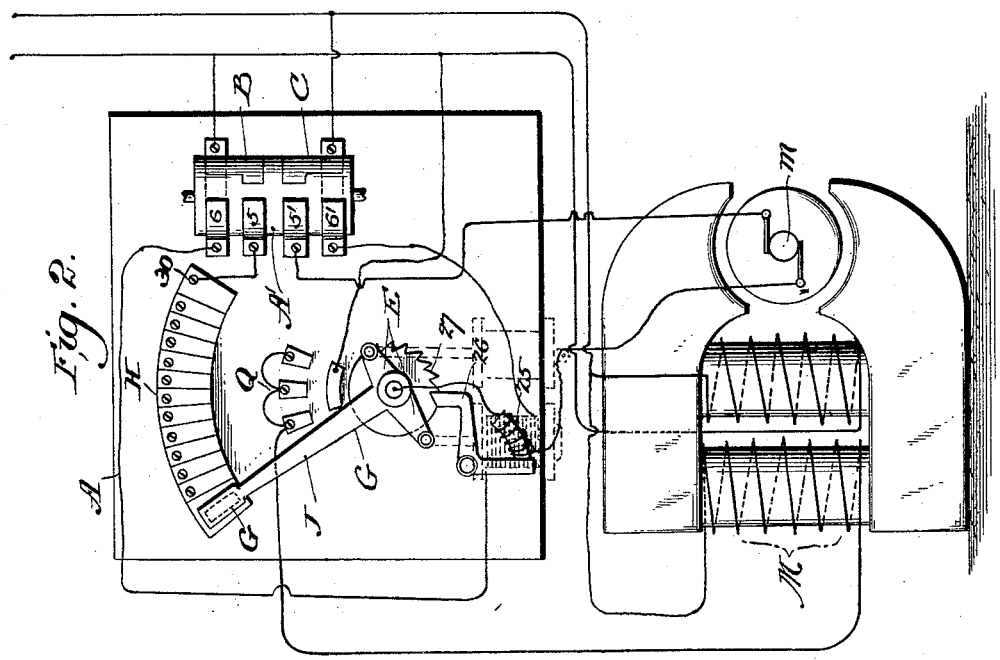
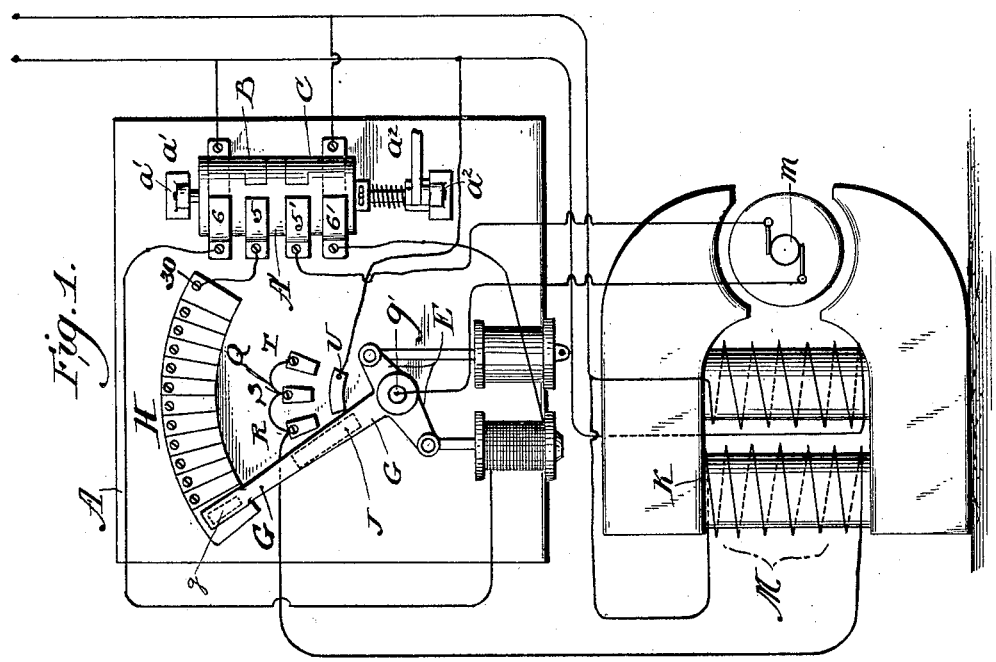
WITNESSES: INVENTOR:

(No Model.) 2 Sheets—Sheet 2.
F. E. HERDMAN.
CONTROLLING DEVICE FOR ELECTRIC MOTORS.
No. 519,122. Patented May 1, 1894.
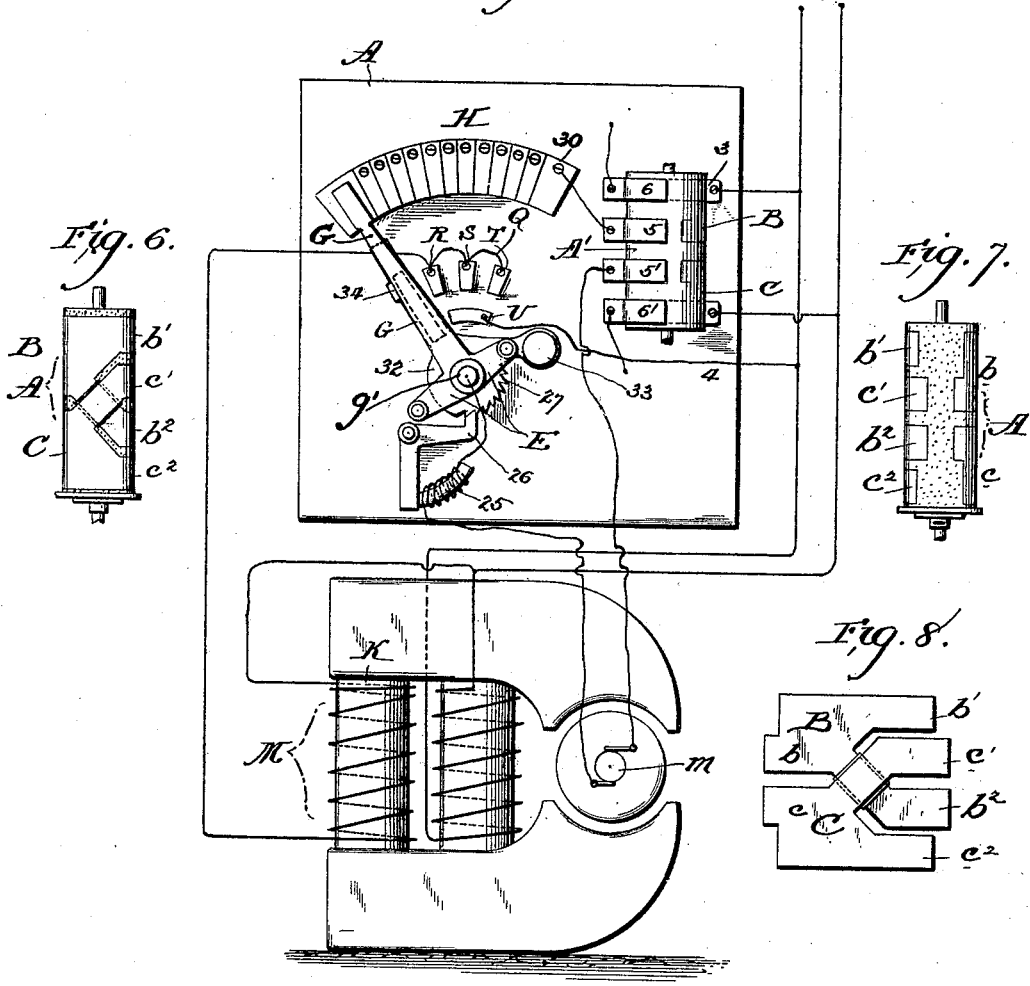
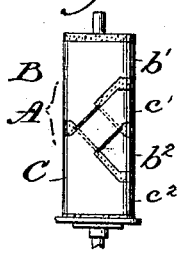
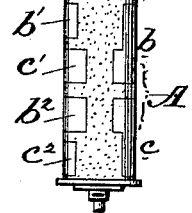
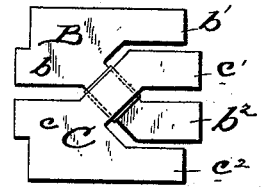
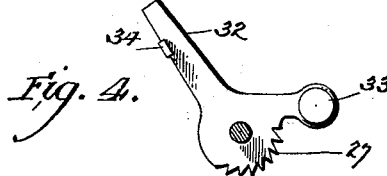
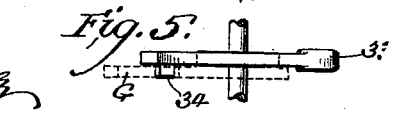
WITNESSES:
INVENTOR:
Frank E. Herdman
by his atty

UNITED STATES PATENT OFFICE.

FRANK E. HERDMAN, OF INDIANAPOLIS, INDIANA.

CONTROLLING DEVICE FOR ELECTRIC MOTORS.

SPECIFICATION forming part of Letters Patent No. 519,122, dated May 1, 1894.

Application filed July 19, 1892. Renewed January 11, 1894. Serial No. 496,548. (No model.)

*To all whom it may concern:*

Be it known that I, FRANK E. HERDMAN, a citizen of the United States, residing at Indianapolis, county of Marion, and State of Indiana, have invented a new and useful Improvement in Electric Motors, of which the following is a full, clear, and exact description, reference being had to the accompanying drawings, which form a part of this specification.

The objects of this invention are to give better contact and greater efficiency in the consumption of the current for the operation of electric motors in use with elevators or when applied to any purpose where they are subject to being constantly stopped, started and reversed.

One of the difficulties to be overcome, especially with elevators, is the great strain upon the main circuit and the central station when starting. Thus, the moment before the armature of the motor commences to revolve after the current is turned on the same, an excessive amount of current is liable to pass through it, causing a momentary strain upon the power supplying the current. As soon as the armature commences to revolve, this strain is gradually reduced until the motor obtains its speed.

My invention consists in certain improved wiring and electrical connection, so that excessive strength is given to the fields at the time the current is thrown on to the motor, and the armature thus revolves that much quicker and also obtains its speed in much less time than if the fields were not strengthened, thereby reducing the strain on the power station. Of course, this greater strength of the fields, if maintained, would prevent the motor from running at its full speed. Consequently, the strength of the fields is reduced as the motor increases its speed to the maximum, at the same time affording the means of reducing to the minimum the strain upon the power station in starting.

In the drawings—Figure 1 is a diagrammatical view. Fig. 2 is a diagrammatical view. Fig. 3 is a diagrammatical view. Fig. 4 is a face view of lever of Fig. 3. Fig. 5 is a plan view of lever of Fig. 3. Figs. 6, 7 and 8 are detail views of switch roller.

M is the motor on the shaft $m$.

A is the rheostat box. In this box is the wooden drum A', loose on the shaft $a$, having bearings $a', a^2$. This drum has upon its face two plates B and C. These plates are of peculiar shape and wound around the drum in a peculiar manner. Thus the plate B has a solid portion $b$ at one end, while at the other end it is formed into two portions $b, b'$, separated by a space. The plate C in a similar manner has at one end the solid portion $c$, and at the other end the two portions $c'', c^2$, separated by a space. These plates are wound around the drum in a peculiar manner, so that they cross one another. At their point of passing, the two plates are separated by an insulated strip. Beneath the drum A', and in contact with the same, are the two brushes 3 and 4, one in contact with the plate B and the other in contact with the plate C. The brush 3 is connected directly with the main circuit, the brush 4 being in direct electrical connection with the other pole of the current supply, the fields of the motor being also in direct electrical connection with the source of current supply. In contact with the top of the cylinder A' are the brushes 5, 5', and 6, 6'. The brushes 6, 6', are in electrical connection with the solenoid (not shown) on the operating arm G. The brush 5 is in electrical connection with contact 30, and the other brush 5' is in electrical connection with the armature of the motor.

E is an arm connected at one end to the solenoid core (not shown); and at the other end, to a dash-pot.

G, is an arm connected to arm E, carrying brush $g$.

H are the resistances, and the arm G, from the point $g'$, is in electrical connection with the armature, so that, through the resistances and arm G, brush 5 is in electrical connection with the armature of the motor. The fields of the motor being excited in the usual manner, with the wiring for the best results for its maximum speed, I wind an additional coil, either on the outside of the regular coil, or, as shown in the drawings, in one coil K on a separate spool, one end of said coil being in electrical connection with one pole of the main circuit.

Q is a resistance, with a series of contacts R, S, T, which are directly in electrical connection with the other end of the extra coil.

U is a contact in electrical connection with the remaining pole of the main circuit, and of extent equal to the extent of contacts R, S, T. To the arm G and insulated from the same is attached a brush J, which is adapted to come in contact both with contacts R, S, T, and contact U. Thus, when the switch is operated to admit the current and the solenoid electrified, the arm G travels over the rheostat. As the arm G moves in contact with the contacts R and U, said contacts are in direct electrical connection with extra coils of field magnets, and as it passes over one contact to the other of the resistance, Q, it gradually draws the resistance into the circuit of these extra coils, thereby reducing their strength until, at the desired point, the arm G passes beyond the resistance R, and the extra coils are thrown out of circuit and the motor allowed to run with the regularly excited fields. In this way, at the starting, the fields are given greater strength, thus giving the armature greater power at starting, with less strain at the central station.

Instead of connecting the armature directly with lever G, I can connect it through a solenoid 25 (see Fig. 2), the core of which is provided with a trip 26 which works in a series of teeth on a wheel 27 attached to the arm G and turning on the same pivot as said arm G. When the current reaches the proper limit to prevent strain on the motor this solenoid 25 will draw in the core and raise the trip 26 until it is in contact with the teeth of wheel 27, thereby preventing any further movement of arm G, thus in consequence retaining a certain amount of current in coil K and retaining a certain amount of resistance in the armature circuit. When the speed of the motor increases so as to reduce the amount of current passing through the solenoid to the armature to within the maximum amount, then the core drops, releasing the trip from the teeth and allowing the arm G to continue its movement to the right, and cutting the resistances out of the armature circuit, also cutting the additional strength out of the fields. If the current passing becomes excessive the solenoid would at once act and again check the movement, thereby preventing an excessive amount of current passing. The brush J instead of being carried by the arm G may be carried by an independent arm (see Figs. 3, 4 and 5). This arm 32 is pivoted to arm E at the same place as arm G (see Fig. 5) and has the toothed wheel 27 in the teeth of which the trip 26 works, a weight 33 is attached to arm 32 and said arm has a projection 34, so said arm 32, and arm G may work independently and the trip 26 and solenoid 25 regulate the movement of said arm. When the current is cut off the arm G in its return movement strikes the projection 34 carrying the arm 32 back with it.

Having now fully described my invention, what I claim, and desire to protect by Letters Patent, is—

1. In combination, a source of current supply, a switch, electrical connection between said switch and the source of current supply, a rheostat, electric connection between said rheostat and switch, a solenoid, electrical connection between said solenoid and switch, an arm operated by the core of said solenoid, and adapted to travel over said resistance, a motor, electric connection between the source of current supply and fields, electric connection between the armature and switch, and electric connection between said armature and the arm operated by the solenoid, an extra coil around the field magnet, a resistance formed of a series of contacts, the first in direct electric connection with said extra coil, said extra coil also being in electrical connection with one pole of the source of current supply, and a contact of extent equal to said resistances in electric connection with the remaining pole of source of current supply, and an arm adapted to pass over said resistance contacts and said contact.

2. In combination, a source of current supply, a switch, electrical connection between said switch and the source of current supply, a rheostat, electric connection between said rheostat and switch, a solenoid, electrical connection between said solenoid and switch an arm operated by the core of said solenoid and adapted to travel over said resistance, a motor, a solenoid in electric connection with said arm, electric connection between the source of current supply and fields, electric connection between the armature of the motor and switch, and electric connection between said armature and solenoid in electric connection with the arm, an extra coil around the field magnet, a resistance formed of a series of contacts, the first in direct electrical connection with said coil, said coil also being in electrical connection with one pole of the source of current supply, and a contact of extent equal to said resistances in electrical connection with the remaining pole of source of current supply, an arm adapted to pass over said resistance contacts, and said contact, a toothed wheel on said arm, a trip attached to the core of the solenoid in electrical connection with the armature, said trip being adapted to work in the teeth of said toothed wheel.

3. In combination a source of current supply, a resistance electrical connection between said resistance and the source of current supply, an arm adapted to travel over said resistance, a motor, electrical connection between the source of current supply and fields, electrical connection between the armature and the source of current supply and electrical connection between said armature and said arm, an extra coil around the field magnet, a resistance, provided with a series of contacts, the first in electrical connection with said coil, said extra coil also being in electrical connection with one pole of the source of current supply and a contact of length equal to said series of resistance contacts and in electrical connection with the remaining pole of the source of current supply and an arm adapted to pass over said resistance contacts and said contact.

4. In combination a source of current supply, a resistance, electrical connection between said resistance and the source of current supply, an arm adapted to travel over said resistance, a motor, a solenoid in electrical connection with said arm, electrical connection between the source of current supply and the field, electrical connection between the armature of the motor and the source of current supply and electrical connection between the armature and solenoid in electrical connection with the arm, an extra coil around the field magnet a resistance formed of a series of contacts, the first in direct electrical connection with said coil, said coil also being in electrical connection with one pole of the source of current supply, and a contact of extent equal to said resistances in electrical connection with the remaining pole of source of current supply, an arm adapted to pass over said resistance contacts and said contact, a toothed wheel on said arm, a trip attached to the core of the solenoid in electrical connection with the armature, said trip being adapted to work in the teeth of said toothed wheel.

5. The hereinbefore described method of operating a motor provided with extra field winding, which consists in admitting the current to the regular winding of the field in a circuit parallel to the armature circuit and to the extra winding in a circuit parallel to the regular field winding circuit, initially admitting current to the armature through resistances, and throwing resistances into the extra winding as the resistances are cut out of the circuit to the armature.

6. The hereinbefore described method of operating a motor provided with extra field winding, which consists in admitting the current to the regular field winding in a circuit parallel to the armature circuit and to the extra winding in a circuit parallel to the regular field winding circuit, admitting current to the armature through resistance, and throwing resistance into the circuit to the extra winding proportionately, but inversely, to the amount of resistance in the circuit to the armature.

7. The combination of a motor provided with extra field winding, a source of current supply, electrical connection with the armature of the motor, resistance in said circuit, an arm for controlling said resistance, electrical connection with the extra field winding, a device for throwing resistance in and out of the circuit to the extra winding, and connection between said device and the resistance arm of the circuit to the armature, the connection being such that the resistance in the circuit to the extra winding is least when the greatest resistance is in the armature circuit, and electrical connection with the regular field winding independent of the circuit to the armature.

8. The combination of a motor provided with extra field winding, a source of current supply, electrical connection with the armature of the motor, resistance in said circuit, an arm for controlling said resistance, electrical connection with the extra field winding, a device for throwing resistance in or out of, and varying the same in, the circuit to the extra winding, and connection between said device and the resistance arm of the circuit to the armature, the connection being such that the resistance in the circuit to the extra field winding is least when the greatest resistance is in the circuit to the armature, and electrical connection with the regular field winding independent of the circuit to the armature.

9. The combination of a motor provided with extra field winding, a source of current supply, electrical connection with the armature of the motor, resistance in said circuit, an arm for controlling said resistance, electrical connection with the extra winding, a device for throwing resistance in or out of the circuit to said extra field winding, connection between said device and the resistance arm, the connection being such that in the movement of the arm in one direction resistance is thrown into the circuit to the extra field winding, and in its movement in the other direction, the resistance is thrown out of the circuit to the extra field winding, and electrical connection with the regular field winding independent of the circuit to the armature.

10. The combination of a motor provided with extra field winding, a source of current supply, electrical connection with the armature of the motor, resistance in said circuit, an arm for controlling said resistance, electrical connection with the extra field winding, a device adapted in its movement in one direction to gradually throw resistance into the circuit to the extra field winding, and in the other direction to gradually cut out said resistance in the circuit to the extra field winding, and connection between said device and the resistance arm, the connection being such that in the movement of said arm in one direction resistance is gradually thrown into circuit to the extra field winding, and in the other direction gradually cut out of the circuit to the extra field winding.

11. The combination of a motor provided with extra field winding, a source of current supply, electrical connection with the armature of the motor, resistance in said circuit, electrical connection with the extra field winding, a device for throwing resistance in and out of circuit to the extra field winding, said device being thrown into action to throw resistance into the circuit to said extra field winding when the resistance in the circuit to the armature is reduced, and electrical connection with the regular field winding independent of the circuit to the armature.

12. The combination of a motor provided with extra field winding, a source of current supply, electrical connection with the armature of the motor, resistance in said circuit, electrical connection with the extra field winding, a device adapted in its movement in one direction to gradually throw resistance into the circuit to the extra field winding, and in the other direction to gradually cut out the resistance from the circuit to the extra field winding, said device being rendered active and caused to move in the direction to throw the resistance into the extra field winding when the resistance in the circuit to the armature is decreased, and to move in the other direction when the resistance in the circuit to the armature is increased, and electrical connection with the regular field winding independent of the circuit to the armature.

13. An electric current transmitting or circuit-closing apparatus comprising essentially a circuit closing device, a secondary contact lever, a solenoid for operating the secondary lever, a circuit connection substantially as set forth whereby upon the closing of the circuit by the circuit closing device the secondary lever is automatically set in motion to gradually increase the strength or quantity of current flowing through the circuit, a second solenoid, in said circuit, adjusted to the desired current, and means to stop the movement of said contact lever when said last mentioned solenoid is rendered active.

14. In combination, a source of current supply, a switch, electrical connection between said switch and the source of current supply, a rheostat, electrical connection between said rheostat and switch, a solenoid, electrical connection between said solenoid and said switch, an arm operated by the core of said solenoid adapted to travel over said resistances, a motor, electrical connection between the source of current supply and the fields, and electrical connection between the armature of the motor and switch, said last mentioned circuit passing through the rheostat, a second solenoid, in the armature circuit, and said last mentioned solenoid being set for the desired current strength to the armature, and means to stop the movement of the resistance arm when said last mentioned solenoid is rendered active.

15. In combination, a source of current supply, a resistance, electrical connection between said resistance and the source of current supply and an arm adapted to travel over said resistance, a motor, electrical connection between the source of current supply and fields, electrical connection between the armature and the source of current supply, the strength of the current in said last mentioned circuit being regulated by said arm, a solenoid in the circuit to the armature, said solenoid being adjusted to the desired current, and means to stop the movement of the arm when said solenoid is rendered active.

16. In combination, a source of current supply, a switch, electrical connection between said switch and the source of current supply, a rheostat, electrical connection between said rheostat and switch, a solenoid, electrical connection between said solenoid and switch, an arm operated by the core of said solenoid and adapted to travel over said resistances, a motor, electrical connection between the source of current supply and fields, electrical connection between the armature of the motor and switch, the strength of current in said last mentioned circuit being regulated by said arm, a second solenoid in the circuit to the armature, said solenoid being adjusted to the desired strength, a toothed wheel on said arm, a trip attached to the core of the last mentioned solenoid, said trip being adapted to work in the teeth of said toothed wheel.

17. In combination, a source of current supply, a resistance, electrical connection between said resistance and the source of current supply, an arm adapted to travel over said resistance, a motor, electrical connection between the source of current supply and field, electrical connection between the armature and source of current supply, the strength of said last mentioned circuit being controlled by said arm, a solenoid, in the circuit to the armature, a toothed wheel on the resistance arm, a trip attached to the core of the last mentioned solenoid, said trip being adapted to work in the teeth of said toothed wheel.

In testimony of which invention I have hereunto set my hand.

FRANK E. HERDMAN.

Witnesses:
W. L. ROBINSON,
W. V. MARTIN.